(12) United States Patent
Liao

(10) Patent No.: US 11,947,954 B2
(45) Date of Patent: Apr. 2, 2024

(54) ELECTRONIC APPARATUS ADAPTED FOR CONTAINER AND SOFTWARE UPDATING METHOD FOR RUNNING CONTAINER SYSTEM

(71) Applicant: QNAP SYSTEMS, INC., New Taipei (TW)

(72) Inventor: Ching Liao, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 244 days.

(21) Appl. No.: 17/560,272

(22) Filed: Dec. 23, 2021

(65) Prior Publication Data

US 2023/0048542 A1 Feb. 16, 2023

Related U.S. Application Data

(60) Provisional application No. 63/232,195, filed on Aug. 12, 2021.

(30) Foreign Application Priority Data

Oct. 29, 2021 (TW) ................................ 11014029.1

(51) Int. Cl.
*G06F 8/656* (2018.01)
*G06F 8/61* (2018.01)
*G06F 9/455* (2018.01)

(52) U.S. Cl.
CPC ............... *G06F 8/656* (2018.02); *G06F 8/63* (2013.01); *G06F 9/45558* (2013.01); *G06F 2009/45587* (2013.01)

(58) Field of Classification Search
CPC ........ G06F 8/63; G06F 8/656; G06F 9/45558; G06F 2009/45587

USPC ......................................................... 717/168
See application file for complete search history.

(56) References Cited

U.S. PATENT DOCUMENTS

| 10,776,236 B1* | 9/2020 | Kudrin et al. ............ G06F 9/54 |
| 2003/0135660 A1 | 7/2003 | Mortazavi |
| 2016/0162320 A1* | 6/2016 | Singh et al. ........ G06F 9/45558 718/1 |

(Continued)

FOREIGN PATENT DOCUMENTS

WO 2016041360 3/2016

OTHER PUBLICATIONS

"Office Action of Taiwan Counterpart Application", dated Aug. 24, 2022, pp. 1-7.

*Primary Examiner* — Wei Y Zhen
*Assistant Examiner* — Mohammed N Huda
(74) *Attorney, Agent, or Firm* — JCIPRNET

(57) ABSTRACT

An electronic apparatus adapted for a container and a software updating method for a running container system are provided. A first software installation package is installed in a host system. The first software installation package includes an executable component used by the host system and a second software installation package. The executable component provides information required by an installation operation of the first software installation package. The second software installation package is made accessible to a container system by the host system based on the executable component. The second software installation package is installed in the container system to update an application in the container system.

10 Claims, 3 Drawing Sheets

(56) References Cited

U.S. PATENT DOCUMENTS

2021/0224061 A1* 7/2021 Pillilli et al. ............ G06F 8/656

* cited by examiner

ELECTRONIC APPARATUS ADAPTED FOR CONTAINER AND SOFTWARE UPDATING METHOD FOR RUNNING CONTAINER SYSTEM

CROSS-REFERENCE TO RELATED APPLICATION

This application claims the priority benefit of U.S. provisional application Ser. No. 63/232,195, filed on Aug. 12, 2021 and Taiwanese application no. 110140291, filed on Oct. 29, 2021. The entirety of each of the above-mentioned patent applications is hereby incorporated by reference herein and made a part of this specification.

BACKGROUND

Technical Field

The disclosure relates to a container technology. Particularly, the disclosure relates to an electronic apparatus adapted for a container and a software updating method for a running container system.

Description of Related Art

On platforms such as Docker, LXC (Linux containers), and Solaris Containers, operating-system-level virtualization technology is provided, and programming codes, libraries, and environment configuration files required by an application are packaged into a container. Host resources can be used and specific applications can be run in the container without installation of an additional guest operating system (OS) in a host operating system.

Generally speaking, if a software function in the container is to be added or updated, the following steps are required to be completed: firstly stopping the container, secondly updating a container image file, and then restarting the container. Notably, the container image file includes all application-related components. Even if a single application alone is updated, it is still required to stop all applications and execute the container again. As shown from above, there may be an issue of efficiency in the existing update mechanism.

SUMMARY

The embodiments of the disclosure provide an electronic apparatus adapted for a container and a software updating method for a running container system, in which a software function in a container can be directly updated without stopping or restarting the container.

According to an embodiment of the disclosure, a software updating method for a running container system is adapted for updating an application in a container system. The software updating method includes (but not limited to) the following. A first software installation package is installed in a host system. The first software installation package includes an executable component used by the host system and a second software installation package. The executable component provides information required by an installation operation of the first software installation package. The second software installation package is made accessible to a container system by the host system based on the executable component. The second software installation package is installed in the container system to update an application in the container system.

According to an embodiment of the disclosure, an electronic apparatus is adapted for updating an application in a container system. The electronic apparatus includes a memory and a processor. The memory is configured to store a programming code. The processor is coupled to the memory. The processor is configured to load and execute the programming code to install a first software installation package in a host system, make a second software installation package accessible to a container system based on an executable component in the host system, and install the second software installation package in the container system to update an application in the container system. The first software installation package includes the executable component used by the host system and the second software installation package. The executable component provides information required by an installation operation of the first software installation package.

Based on the foregoing, in the electronic apparatus adapted for a container and the software updating method for a running container system of the embodiments of the disclosure, during the installation operation of the software function in the host system, the installation package of the application in the container is made accessible to the container system. Moreover, in the container system, one or more applications can be updated through execution of the accessed installation package without restarting the container. Accordingly, the update efficiency for the application in the container can be improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
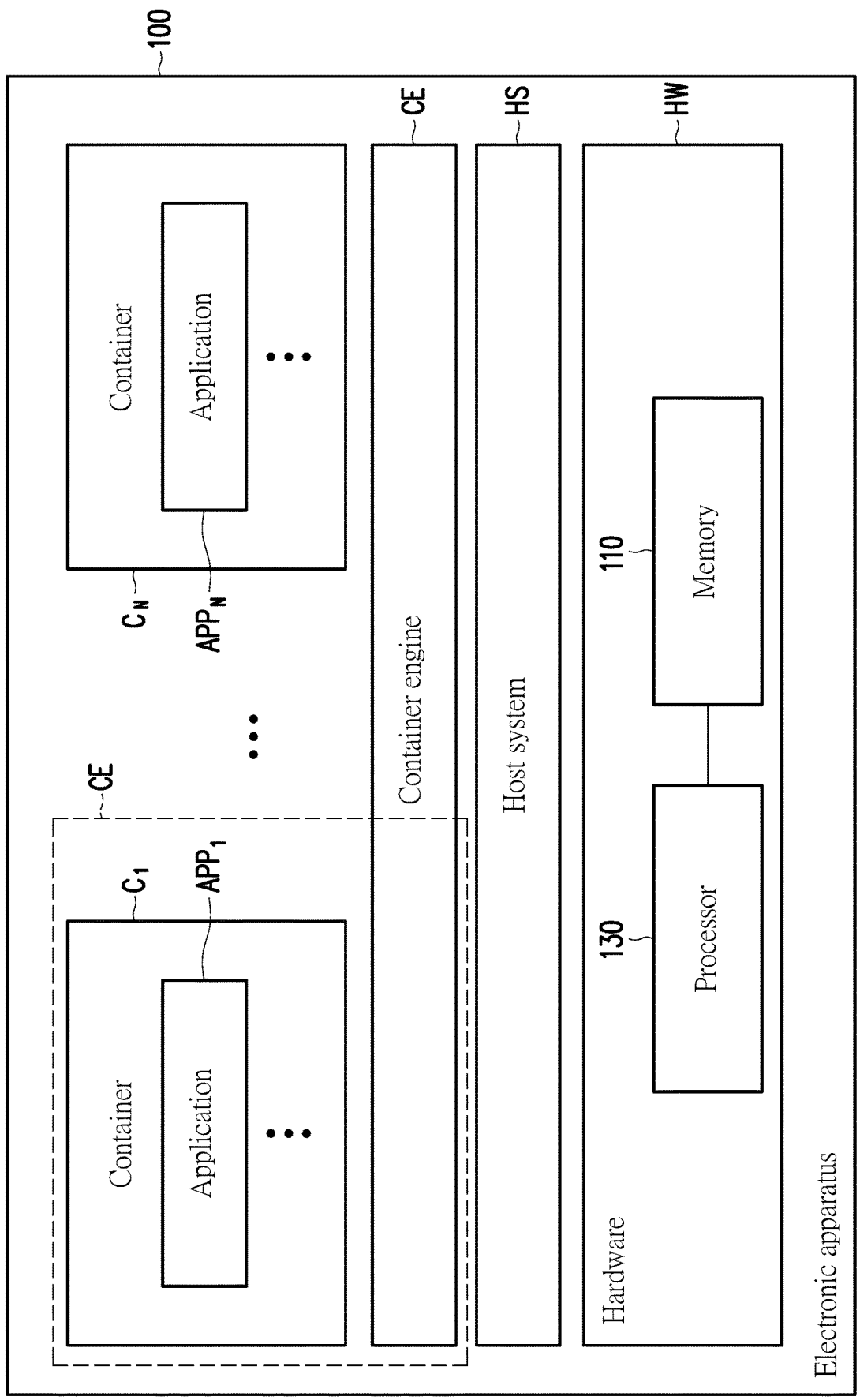
FIG. 1 is a block diagram of elements of an electronic apparatus according to an embodiment of the disclosure.

FIG. 1 is a block diagram of elements of an electronic apparatus 100 according to an embodiment of the disclosure. With reference to FIG. 1, the electronic apparatus 100 may be a mobile phone, a tablet computer, a notebook computer, a desktop computer, a server, a smart home appliance, a voice assistant, or other electronic apparatuses. Hardware HW of the electronic apparatus 100 includes (but not limited to) a memory 110 and a processor 130.

The memory 110 may be any type of fixed or removable random access memory (RAM), read only memory (ROM), flash memory, traditional hard disk drive (HDD), solid-state drive (SSD), or similar elements. In an embodiment, the memory 110 is configured to store programming codes, software modules, configurations, data, or files (e.g., image files or installation packages).

The processor 130 is coupled to the memory 110. The processor 130 may be a central processing unit (CPU), graphic processing unit (GPU), or other programmable general-purpose or special-purpose microprocessor, digital signal processor (DSP), programmable controller, field programmable gate array (FPGA), application-specific integrated circuit (ASIC), or other similar elements or a combination of the above elements. In an embodiment, the processor 130 is configured to execute all or part of operations of the electronic apparatus 100, and may load and execute the programming codes, software modules, files, and data stored in the memory 110.

In terms of system architecture, the processor 130 runs a host system HS. The host system HS may be Windows, MAC OS, Linux, or other operating systems. A container engine CE (or referred to as a container manager) is installed and run in the host system HS. The container engine CE may be Docker, LXC (Linux containers), Solaris Containers, or other container engines/managers. The container engine CE may utilize one or more image files to create and run one or more containers $C_1$ to $C_N$, where N is a positive integer. The container $C_1$ may run one or more applications (or referred to as services or programs) $APP_1$. By analogy, the container $C_N$ may run one or more applications $APP_N$. For the convenience of description below, any one of the containers $C_1$ to $C_N$ and the container engine CE are collectively referred to as a container system CS. However, functions of the container system CS may be realized by one or more of the containers $C_1$ to $C_N$ and the container engine CE.

A method according to the embodiments of the disclosure accompanied with devices, elements, and modules in the electronic apparatus 100 will be described below. The process flows of the method are not limited thereto and may be adjusted depending on the situation of implementation.

Figure 2:
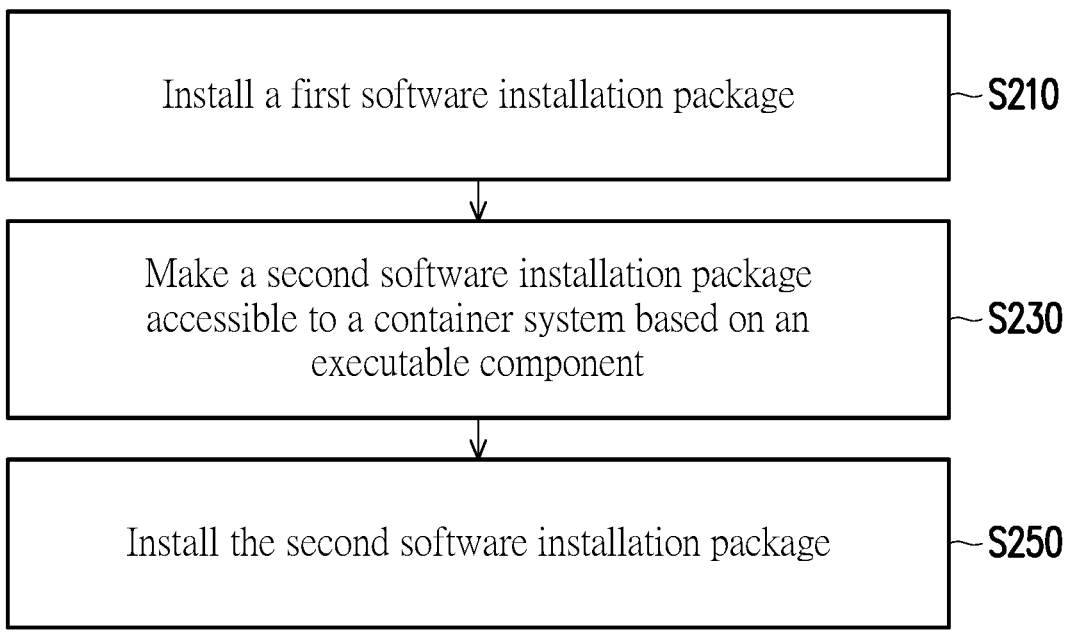
FIG. 2 is a flowchart of a software updating method according to an embodiment of the disclosure.

FIG. 2 is a flowchart of a software updating method according to an embodiment of the disclosure. With reference to FIG. 2, a first software installation package (or referred to as a software installation package A) is installed in the host system HS (step S210). Specifically, the first software installation package is a file executable in the host system HS and configured to perform an installation operation, that is, an installation file conforming to a native format (e.g., EXE or MSI) of the host system HS. Executing the installation package may start the installation operation, for example, decompressing the file to a storage medium (e.g., the memory 110 or other hard drives), and complete tasks such as modifying the registry, modifying system settings, creating shortcuts, performing verification, and issuing notifications.

Figure 3:
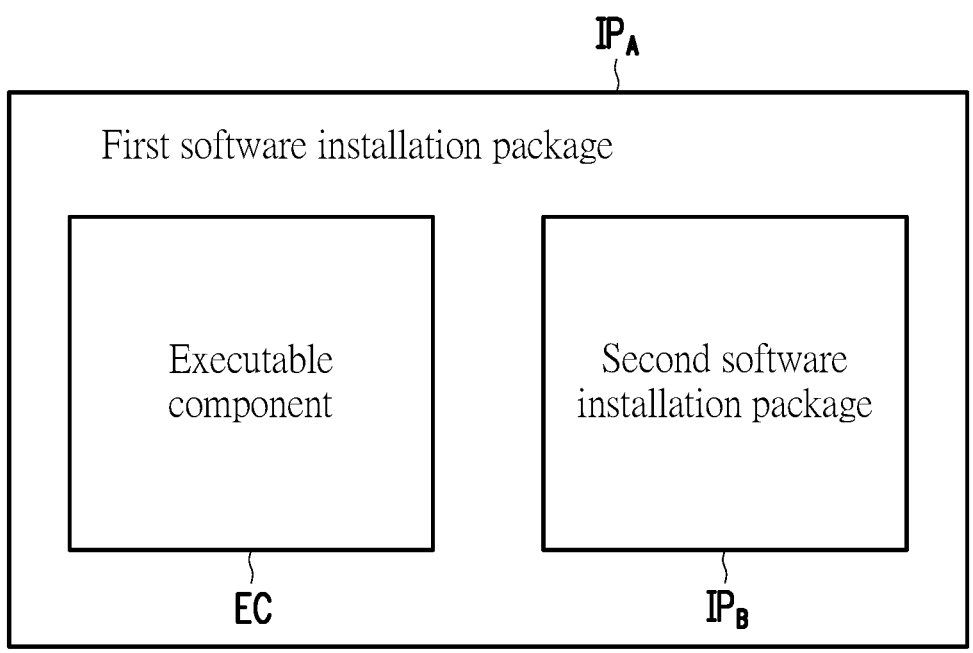
FIG. 3 is a schematic diagram of a software installation package according to an embodiment of the disclosure.

FIG. 3 is a schematic diagram of a software installation package according to an embodiment of the disclosure. With reference to FIG. 3, a first software installation package $IP_A$ includes (but not limited to) an executable component EC and a second software installation package $IP_B$ (or referred to as a software installation package B). The executable component EC is available for use by the host system HS and provides information required by the installation operation of the first software installation package $IP_A$. For example, the executable component EC includes a description file for describing the manner and sequence of execution of one or more tasks (e.g., copying files to a specified storage location, calling specific modules, and the like) in the installation operation. Different from the first software installation package $IP_A$, the second software installation package $IP_B$ is executed in the container system CS and configured to execute files of the installation operation, that is, an installation file conforming to a native format of the container system CS. In addition, the second software installation package $IP_B$ is a one or more files or settings configured to update one or more applications in the container system CS.

Regarding the creation of the installation package, in an embodiment, the electronic apparatus 100 or other external computing devices may package the relevant files required to execute the container system CS into the second software installation package $IP_B$ by utilizing the native format of the container system CS. Moreover, the electronic apparatus 100 or other external computing devices may package the relevant files (e.g., the executable component EC) required to execute the host system HS and the second software installation package $IP_B$ into the first software installation package $IP_A$ by utilizing the native format of the host system HS.

With reference to FIG. 2, the host system HS makes the second software installation package accessible to the container system CS based on the executable component (step S230). Specifically, the tasks recorded in the description file of the installation operation in the executable component may enable the container system CS to access the second software installation package. In other words, in the installation operation of the first software installation package, the host system HS enables the container system CS to access the second software installation package. Also notably, without stopping or restarting the container system CS (e.g., during operation of the container $C_1$ or the container $C_N$), the second software installation package may still be accessed.

Figure 4:
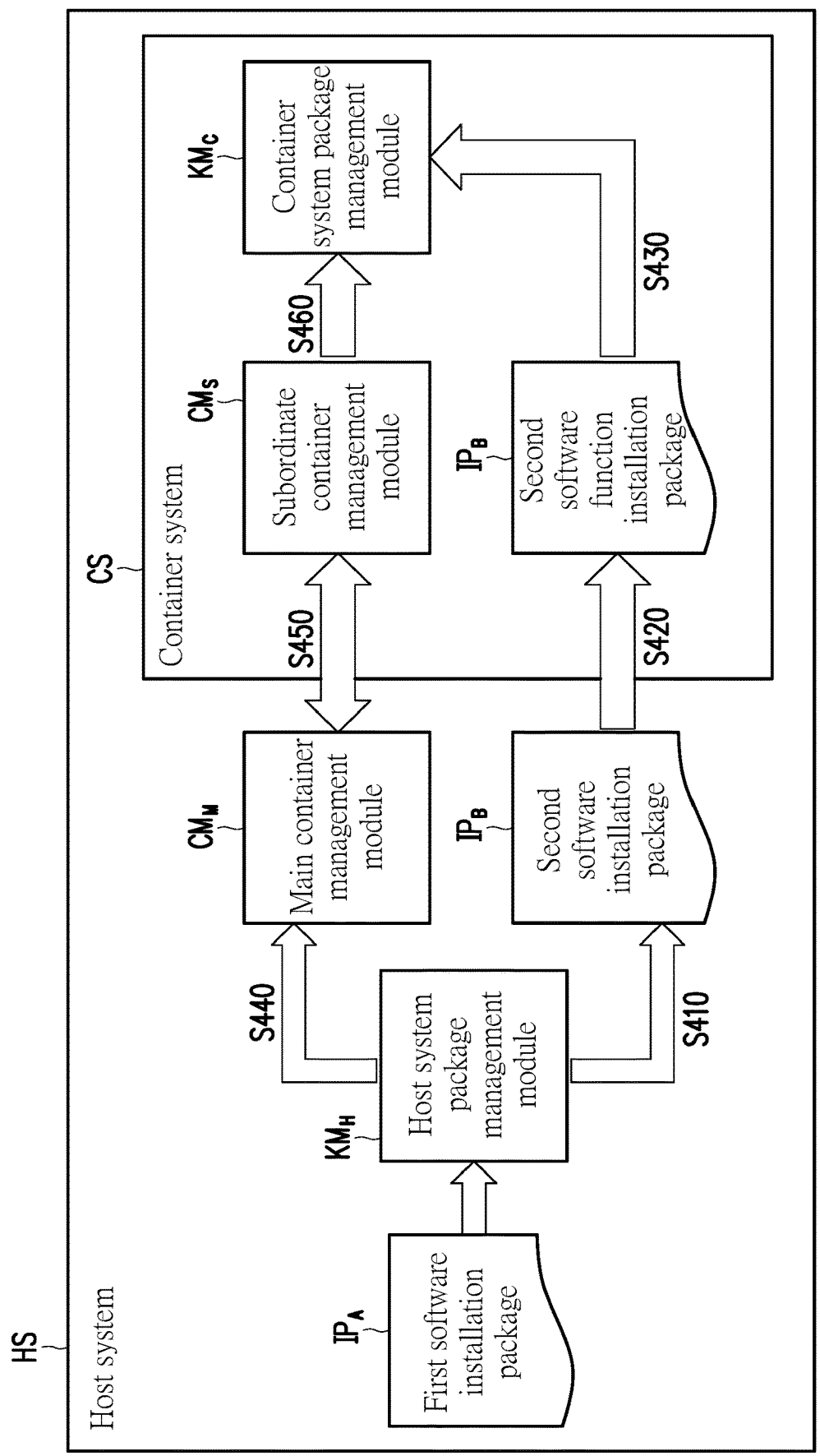
FIG. 4 is a flowchart of updating software according to an embodiment of the disclosure.

FIG. 4 is a flowchart of updating software according to an embodiment of the disclosure. With reference to FIG. 4, in an embodiment, when the container $C_1$ (the container $C_1$ taken as an example, and possibly the other containers $C_N$) is started, the processor 130 may mount a host directory/folder (e.g., /host) in the host system HS on a container directory (e.g., /docker) in the container system CS. Therefore, the files in the host directory may be accessible to the container system CS. After the host system HS executes the first software installation package $IP_A$, a host system package management module $KM_H$ may obtain the second software installation package $IP_B$ from the first software installation package $IP_A$ (step S410). For example, the executable component EC instructs to decompress the second software installation package $IP_B$ to a specific directory. In addition, the host system HS stores the second software installation package $IP_B$ in the host directory of the host system HS (step S420). For example, the processor 130 copies the second software installation package $IP_B$ to the host directory from a temporary storage folder used by the decompression of the installation operation. Accordingly, the container system CS may access the second software installation package $IP_B$ in the container directory.

In another embodiment, the container system CS may run a file server (e.g., a File Transfer Protocol (FTP) server or Common Internet File System (CIFS)), and the executable component EC instructs to upload the second software installation package $IP_B$ through a network to the file server, which is, for example, in the container $C_1$.

In other embodiments, the host system HS and the container system CS respectively execute file transfer programs, and the second software installation package $IP_B$ is sent to the container system CS by utilizing the file transfer programs.

With reference to FIG. 2, the second software installation package is installed in the container system CS to update an application in the container system CS (step S250). Specifically, with reference to FIG. 4, the host system package management module $KM_H$ may call a main container management module $CM_M$ (step S440). The main container management module $CM_M$ is in charge of managing the containers $C_1$ to $C_N$, is run in the host system HS, and serves as a bridge program for communication between the host system HS and the container system CS. In an embodiment, the host system package management module $KM_H$ also verifies the correctness or completeness of the first software installation package, and calls the main container management module $CM_M$ according to a verification result.

After receiving the call, the main container management module $CM_M$ sends a notification message to a subordinate container management module $CM_S$ (step S450). The notification message is configured to notify the container system CS to execute an installation operation of the second software installation package $IP_B$. In other words, the container system CS may start the installation operation of the second software installation package $IP_B$ according to the notification message from the host system HS. In addition, different from the main container management module $CM_M$, the subordinate container management module $CM_S$ is run in the container system CS.

In an embodiment, the main container management module $CM_M$ may verify identity information of a caller. For example, the main container management module $CM_M$ checks whether a program identification number of the caller is in a whitelist. If the caller is in the whitelist, it means that the caller is the correct for the main container management module $CM_M$. It should be noted that the identity information may also be other codes or symbols for identifying the caller, which is not limited by the embodiments of the disclosure. In addition, according to a verification result of the identity information, the main container management module $CM_M$ may notify (e.g., send the notification message to) the container system CS to start the installation operation of the second software installation package $IP_B$. If the verification result of the identity information is failed, the installation operation of the second software installation package $IP_B$ is disabled/not started, for example, by not sending the notification message to the container system CS. If the verification result of the identity information is successful, the installation operation of the second software installation package $IP_B$ is started, for example, by sending the notification message to the container system CS.

In an embodiment, to enhance information security protection, data sent between the main container management module $CM_M$ and the subordinate container management module $CM_S$ needs to be encrypted and decrypted. For example, the main container management module $CM_M$ may encrypt the notification message, and the subordinate container management module $CM_S$ may decrypt the notification message from the host system HS. If the subordinate container management module $CM_S$ cannot decrypt the notification message, the notification message may have been tampered with, and the installation operation may be interrupted accordingly.

For key encryption, in an embodiment, similar to an encryption mechanism adopted by HyperText Transfer Protocol Secure (HTTPS), the main container management module $CM_M$ creates a set of keys, i.e., a main public key and a corresponding main private key. Data or messages encrypted by the main private key may be successfully decrypted by the main public key. In addition, the subordinate container management module $CM_S$ creates a set of keys, i.e., a subordinate public key and a corresponding subordinate private key. Data or messages encrypted by the subordinate private key may be successfully decrypted by the subordinate public key.

Before the notification message is sent or other data transfers are established, the main container management module $CM_M$ of the host system HS and the subordinate container management module $CM_S$ of the container system CS exchange a copy of the public keys with each other. In other words, the main container management module $CM_M$ sends a copy of the main public key to the subordinate container management module $CM_S$, and the subordinate container management module $CM_S$ sends a copy of the subordinate public key to the main container management module $CM_M$.

Then, the exchanged public key may be verified to confirm whether to perform subsequent data transfers. The main container management module $CM_M$ may encrypt a confirmation message using the main private key and send the encrypted confirmation message to the subordinate container management module $CM_S$. In other words, the confirmation message is encrypted by the main private key. The subordinate container management module $CM_S$ may decrypt the confirmation message from the main container management module $CM_M$ using the main public key, and respond to the confirmation message from the main container management module $CM_M$ according to a decryption result of the main public key. If the decryption result indicates that the decryption of the confirmation message is failed, then the subordinate container management module $CM_S$ disables/does not respond to the confirmation message, and accordingly disables subsequent data transfers (e.g., sending the notification message), for example, by refusing subsequent data transfers. If the decryption result indicates a successful decryption of the confirmation message, the subordinate container management module $CM_S$ may send a response message in response to the confirmation message to the main container management module $CM_M$. Notably, the subordinate container management module $CM_S$ encrypts the response message using the subordinate private key. In other words, the response message is encrypted by the subordinate private key.

The main container management module $CM_M$ may decrypt the response message from the subordinate container management module $CM_S$ using the subordinate public key, and enable the transmission of the notification message or other subsequent data transfers according to a decryption result of the subordinate public key. If the decryption result indicates that the decryption of the response message is failed, then the main container management module $CM_M$ disables subsequent data transfers (e.g., sending the confirmation message), and also disables/does not start the installation operation of the second software installation package $IP_B$, for example, by deleting or locking the second software installation package $IP_B$. If the decryption result indicates a successful decryption of the response message, the main container management module $CM_M$ may enable subsequent data transfers (e.g., sending the notification message) with the subordinate container management module $CM_S$.

For the encryption mechanism of subsequent transfers of the notification message and other data, in an embodiment, the main container management module $CM_M$ generates a set of secret keys randomly or according to a specific algorithmic mechanism. The main container management module $CM_M$ may attach the secret keys in the confirmation message. In other words, the confirmation message includes the secret keys. Alternatively, after verifying the public key of the subordinate container management module $CM_S$, the main container management module $CM_M$ may send the secret keys encrypted by the main private key to the subordinate container management module $CM_S$. Then, based on a symmetric encryption mechanism, the main container management module $CM_M$ may encrypt the notification message or other data using the secret keys, and the subordinate container management module $CM_S$ may decrypt the notification message or other data from the main container management module $CM_M$ using the secret keys. If the decryption of the notification message is failed, the subordinate container management module $CM_S$ disables/does not start the installation operation of the second software installation package $IP_B$, for example, by deleting or locking the second software installation package $IP_B$. If the decryption of the notification message is successful, the subordinate container management module $CM_S$ may enable the installation operation of the second software installation package $IP_B$.

It should be noted that, in some embodiments, the main private key and/or the subordinate private key may be encrypted using other fixed secret keys based on a symmetric encryption mechanism. If the use of the private key is needed, a successful decryption of the private key is firstly required. In addition, the encryption may also include a digital signature, specific coding, or other encryption mechanisms, which is not limited by the embodiments of the disclosure. Accordingly, it is possible to prevent others from tampering with data or fraudulently using management modules.

The subordinate container management module $CM_S$ calls a container system package management module $KM_C$ running in the container system CS (step S460) to execute an installation operation in the container system CS (step S430). For example, executing the second software installation package $IP_B$ may copy files to a specific storage location, and complete tasks such as issuing commands, modifying settings, and issuing notifications. In other words, the update of applications is achieved through the package management service in the container system CS.

It should be noted that, during the installation operation, the application to be updated by the second software installation package $IP_B$ may stop. However, the container or other applications in the container can still continue running.

In an embodiment, the container system package management module $KM_C$ also verifies the second software installation package $IP_B$, for example, by verifying the correctness or completeness of the second software installation package $IP_B$. The container system package management module $KM_C$ starts the installation operation of the second software installation package $IP_B$ according to a verification result of the second software installation package $IP_B$. For example, if the verification result of the installation package is failed, the installation operation is interrupted or the second software installation package $IP_B$ in the container system CS is deleted.

In an embodiment, the subordinate container management module $CM_S$ may report an installation result, for example, a message whether the installation is successful or failed, of the second software installation package $IP_B$ to the main container management module $CM_M$.

It should be noted that, in some embodiments, the main container management module $CM_M$ and the subordinate container management module $CM_S$ may be omitted. In addition, the host system HS may notify the container system CS to execute the installation operation of the second software installation package $IP_B$ in other ways.

In summary of the foregoing, in the electronic apparatus adapted for a container and the software updating method for a running container system according to the embodiments of the disclosure, the installation package executable by the container system is made accessible to the container system through the installation operation in the host system, so that another installation operation can execute and update an application in the container system. Accordingly, it is possible to update only a specific application during operation of the container, thus improving the installation efficiency. In addition, according to the embodiments of the disclosure, encrypted communication is provided between the host system and the container system to enhance information security protection.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A software updating method for a running container system, the software updating method adapted for updating an application in a container system, and the software updating method comprising:

installing a first software installation package in a host system, wherein the first software installation package comprises an executable component used by the host system and a second software installation package, and the executable component provides information required by an installation operation of the first software installation package;

by the host system, making the second software installation package accessible to a container system based on the executable component; and installing the second software installation package in the container system to update an application in the container system, comprising:

starting an installation operation of the second software installation package by the container system according to a notification message from the host system, wherein before installing the second software installation package, the software updating method further comprises:

encrypting the notification message by the host system; and decrypting the notification message from the host system by the container system, wherein before encrypting the notification message by the host system, the software updating method further comprises:

exchanging a main public key of the host system and a subordinate public key of the container system, wherein the main public key corresponds to a main private key, and the subordinate public key corresponds to a subordinate private key;

responding to a confirmation message from the host system by the container system according to a decryption result of the main public key, wherein the main public key is used to decrypt the confirmation message, and the confirmation message is encrypted by the main private key; and enabling a transmission of the notification message by the host system according to a decryption result of the subordinate public key, wherein the subordinate public key is used to decrypt a response message from the container system in response to the confirmation message, and the response message is encrypted by the subordinate private key.

2. The software updating method according to claim 1, wherein making the second software installation package accessible to the container system based on the executable component comprises:
obtaining the second software installation package from the first software installation package by the host system; and
by the host system, storing the second software installation package in a host directory in the host system, wherein the host directory is mounted on a container directory in the container system.

3. The software updating method according to claim 1, wherein installing the second software installation package comprises:
verifying identity information of a caller by the host system; and
notifying the container system by the host system to start an installation operation of the second software installation package according to a verification result of the identity information.

4. The software updating method according to claim 1, wherein the confirmation message comprises a secret key,
encrypting the notification message by the host system comprises:
encrypting the notification message by the host system using the secret key, and
decrypting the notification message from the host system by the container system comprises:
decrypting the notification message by the container system using the secret key.

5. The software updating method according to claim 1, wherein installing the second software installation package comprises:
verifying the second software installation package by the container system; and
starting an installation operation of the second software installation package by the container system according to a verification result of the second software installation package.

6. An electronic apparatus adapted for updating an application in a container system, the electronic apparatus comprising:
a memory, configured to store a programming code; and
a processor, being coupled to the memory and configured to load and execute the programming code to:
install a first software installation package in a host system, wherein the first software installation package comprises an executable component used by the host system and a second software installation package, and the executable component provides information required by an installation operation of the first software installation package;
make the second software installation package accessible to a container system based on the executable component in the host system; and
install the second software installation package in the container system to update an application in the container system, wherein the processor is further configured to:
exchange a main public key of the host system and a subordinate public key of the container system, wherein the main public key corresponds to a main private key, and the subordinate public key corresponds to a subordinate private key;
respond to a confirmation message from the host system in the container system according to a decryption result of the main public key, wherein the main public key is used to decrypt the confirmation message, and the confirmation message is encrypted by the main private key;
enable a transmission of a notification message in the host system according to a decryption result of the subordinate public key, wherein the subordinate public key is used to decrypt a response message from the container system in response to the confirmation message, and the response message is encrypted by the subordinate private key;
encrypt the notification message in the host system;
decrypt the notification message from the host system in the container system;
start an installation operation of the second software installation package in the container system according to the notification message from the host system.

7. The electronic apparatus according to claim 6, wherein the processor is further configured to:
obtain the second software installation package from the first software installation package in the host system; and
store the second software installation package in a host directory in the host system, wherein the host directory is mounted on a container directory in the container system.

8. The electronic apparatus according to claim 6, wherein the processor is further configured to:
verify identity information of a caller in the host system; and
notify the container system to start an installation operation of the second software installation package in the host system according to a verification result of the identity information.

9. The electronic apparatus according to claim 6, wherein the confirmation message comprises a secret key, and the processor is further configured to:
encrypt the notification message in the host system using the secret key, and
decrypt the notification message in the container system using the secret key.

10. The electronic apparatus according to claim 6, wherein the processor is further configured to:
verify the second software installation package in the container system; and
start an installation operation of the second software installation package in the container system according to a verification result of the second software installation package.

* * * * *